United States Patent

Zeley

[11] 4,057,229
[45] Nov. 8, 1977

[54] IGNITION ROD AND FEED DEVICE

[76] Inventor: J. A. Zeley, Apartado Postal 60061, Caracas, Venezuela

[21] Appl. No.: 671,110

[22] Filed: Mar. 29, 1976

[30] Foreign Application Priority Data

Mar. 27, 1975 Germany .............................. 2513584

[51] Int. Cl.² .............................................. B23K 7/06
[52] U.S. Cl. ...................................... 266/48; 214/1.5; 221/253; 266/75; 403/284; 403/300; 403/334
[58] Field of Search .................... 221/79, 88, 198, 253; 228/56, 41; 266/48, 74, 75; 403/300, 334, 274, 284; 239/84; 214/1.5

[56] References Cited

U.S. PATENT DOCUMENTS

| 557,037 | 3/1896 | Toquet | 403/284 X |
| 2,120,243 | 6/1938 | Droll | 403/334 X |
| 3,650,414 | 3/1972 | Asada et al. | 214/1.5 X |
| 3,933,533 | 1/1976 | Uchida et al. | 266/75 X |

OTHER PUBLICATIONS

Welding Handbook, Sixth Edition, American Welding Society, 1972, p. 61.5.

Primary Examiner—Roy Lake
Assistant Examiner—Paul A. Bell
Attorney, Agent, or Firm—Gifford, Chandler, Sheridan & Sprinkle

[57] ABSTRACT

An ignition rod for an oxygen flame cutting and welding apparatus comprising a plurality of individual rod elements and a device for feeding the ignition rod from storage to a point of use.

9 Claims, 8 Drawing Figures

IGNITION ROD AND FEED DEVICE

BACKGROUND OF THE INVENTION

I. Field of the Invention

The present invention relates to oxygen flame cutting and welding apparatus and more particularly to a new ignition means for such apparatus.

II. Description of the Prior Art

In oxygen flame cutting and welding apparatus an ignition device is provided near the flame to provide the necessary heat for joining or separating the workpiece. Generally such a device takes the form of iron either as a wire or as a powder which as it combines with the oxygen melts to create heat at the working face.

This process is especially useful with high temperature alloys where without this method it would be virtually impossible to create the heat necessary to join or to separate the materials.

Previously either an iron wire or iron powder has been used as the ignition means. Where iron powder is used it generally is directed to the point of the flame by compressed air or any other dry gas.

While such an ignition means has proven generally satisfactory it requires equipment which is subject to breakdowns. It creates storage and transportation problems with respect to the powder and the equipment is generally bulky and expensive.

Prior art ignition devices have also taken the form of wire held on a reel and moved into the flame in step-by-step fashion. Powder is more suitable for some materials and thus this form of ignition device is not satisfactory for all processes. Further, on automatic equipment the wire must go through straightening rollers to insure that there are no kinks and bends. Bends in the wire will cause the apparatus to jam up which in turn can cause the wire to melt back to the holder, heating it to a dangerous level, and even causing it to be fused together and damaged by the heat.

Straightening rollers will not insure that all bends will be removed from the wire and if it is corroded or rusty it can still become jammed.

Short individual ignition rods can also be used but heretofore this has created waste because not all of the rod could be used. The use of such rods with automatic equipment was not heretofore possible. The feed device would have to be very near the flame because of the shortness of the rod which again could cause the feed device to be unduly heated and thereby damaged.

SUMMARY OF THE PRESENT INVENTION

The present invention provides an ignition rod formed from a plurality of rod elements. A device is provided for storing the rod elements and for feeding them one at a time, joined together, to thereby produce an ignition rod of any desired length.

In one form of the invention a tubular connecting member is provided to connect the rear of one rod element to the front of another similar rod element.

In another form the rod elements are provided with a conically formed front portion and an axially extending matching recess in the rear portion. The rod elements are joined together by inserting the front conical portion of one into the matching rear recess of another rod element. Again in this manner an ignition rod of any desired length can be provided.

In another embodiment of the invention each of the rod elements is provided with an inner compartment which is filled with a suitable powder such as iron powder or aluminum powder.

Devices are also provided for storing and feeding the rod elements to the point of use.

DESCRIPTION OF THE DRAWINGS

A better understanding of the present invention will be achieved upon reference to the drawings attached hereto in which like reference numerals refer to like parts throughout the several views and in which.

DESCRIPTION OF SEVERAL PREFERRED EMBODIMENTS

Figure 1:
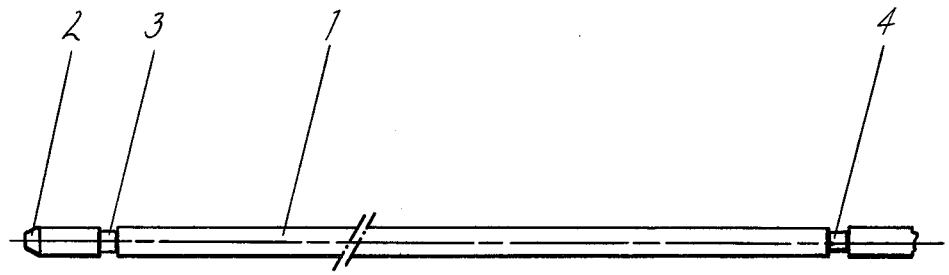
FIG. 1 shows a rod element of the present invention with an annular indentation at the forward and at the rear end thereof.

FIG. 1 illustrates a rod element 1 formed with a frustoconical forward end 2 and an annular notch 3 near the forward end 2. A similar annular notch 4 is provided near the rear end of the rod element 1.

Figure 2:
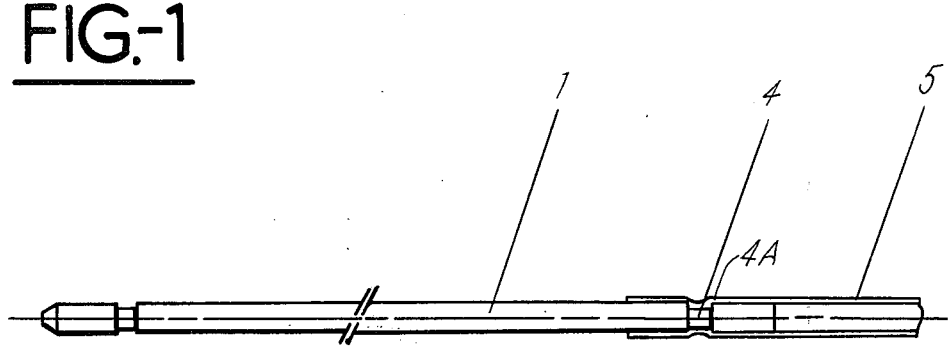
FIG. 2 illustrates the rod element of FIG. 1 with a connecting member mounted to the rear thereof.

FIG. 2 illustrates the rod element 1 with a tubular connector member 5 securely mounted to the rear portion of the rod element 1. The tubular connector member 5 is provided with an indented annular portion 4a which seats in the annular notch 4 formed at the rear portion of the rod element 1.

Figure 3:
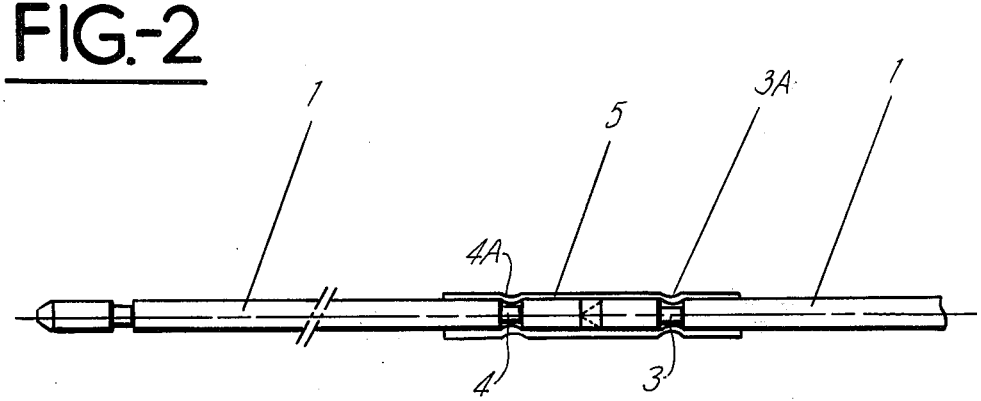
FIG. 3 illustrates two rod elements like that shown in FIG. 1 connected together by a connecting member.

FIG. 3 illustrates two rod elements 1 connected together by the connector member 5. The first rod element 1 is mounted with its rear end portion within the tubular connector member 5 as illustrated in FIG. 1 while the forward end of the second rod element 1 is mounted within the tubular connector member 5. The connector member 5 is provided with an indented portion 4A which seats in the annular notch 4 of the first rod element and an indented portion 3A which seats in the annular notch 3 of the second rod element 1. In this manner the connector member 5 forms a rigid connection between adjacent rod elements 1 so that a single ignition rod can be formed of any desired length by utilizing any desired number of rod elements 1 and connector members 5.

Figure 4:
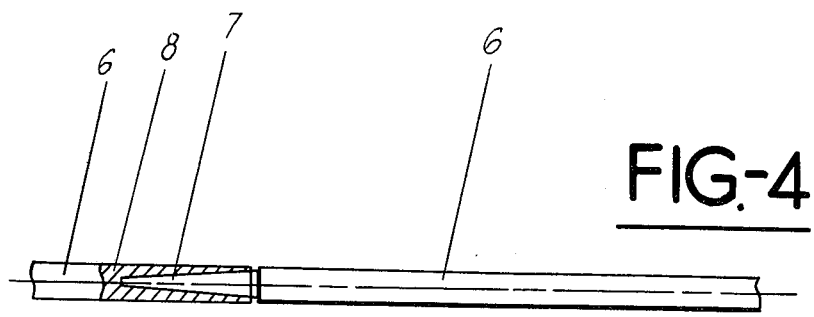
FIG. 4 illustrates another preferred embodiment of the present invention in which a conically formed forward end of one rod element is seated in a matching recess in the rear end of another rod element.

FIG. 4 illustrates another preferred rod element 6. The rod element 6 is provided at one end with a conically shaped head 7 and at the opposite end with a conically shaped axial recess 8. An ignition rod is formed by joining several rod elements 6 together by inserting the conical head 7 of one rod element 6 into the conical recess 8 of another rod element 6 as shown in FIG. 4. The dimensions of the recess 8 and the conical head 7 are such that a rigid connection is provided between adjacent rod elements 6 when the head 7 of one is inserted in the recess 8 of another.

Figure 5:
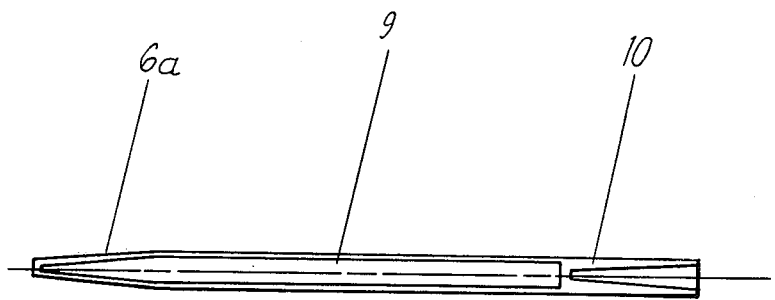
FIG. 5 illustrates a rod element similar to the rod element shown in FIG. 4 but filled with powder.

FIG. 5 illustrates a rod element 6a adapted to be connected with other rod elements (not shown) in a manner like that shown in FIG. 4. The rod element 6a, however, is hollow to provide a closed inner compartment 9 which is preferably filled with iron powder or aluminum powder. The rear of the compartment 9 is closed by a stop portion 10.

Ignition rods can be formed from the rod elements 6a in the manner illustrated in FIG. 4. With the ignition rod formed in this manner as the burning process proceeds the outer shell of the rod element 6A will melt and the powder will be conducted to the flame without the need for compressed air or other gases. Different powders can, of course, be provided for workpieces of different materials. At the end of a cut or a joining step the front of the rod element 6a will have melted and upon cooling will seal up the front of the compartment to retain and protect the unused powder. This, of course, reduces waste. An ignition rod of this type is especially useful with high strength alloy materials where powder is necessary to produce sufficient heat to melt the material.

While it has been preferred to illustrate the rod elements 6a with means for joining them together like those shown in FIG. 4, it should be apparent that the rod elements 6a could instead be formed to be joined together by connector members like those shown in FIGS. 1—3.

Figure 6:
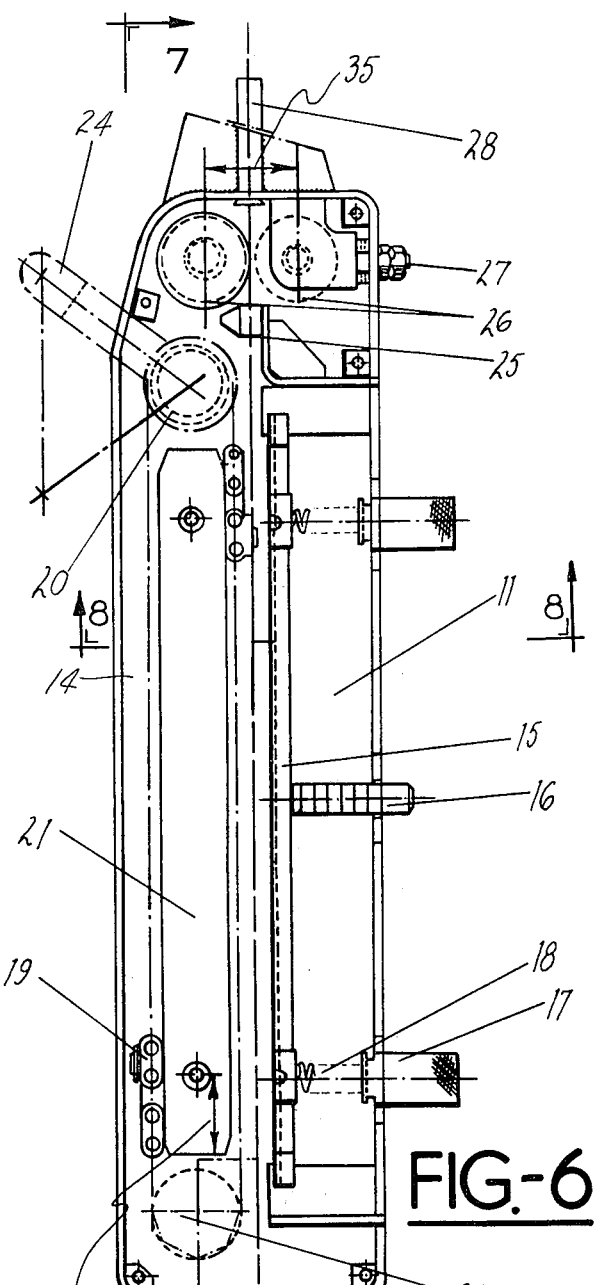
FIG. 6 illustrates an apparatus for storing and delivering an ignition rod comprised of a plurality of the rod elements like those shown in FIGS. 1 to 5.
Figure 8:
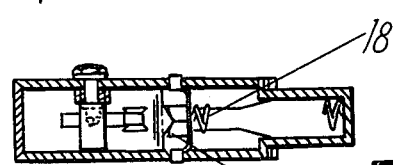
FIG. 8 is a view taken along line 8—8 of FIG. 6 but is inverted for the sake of clarity.
Figure 7:
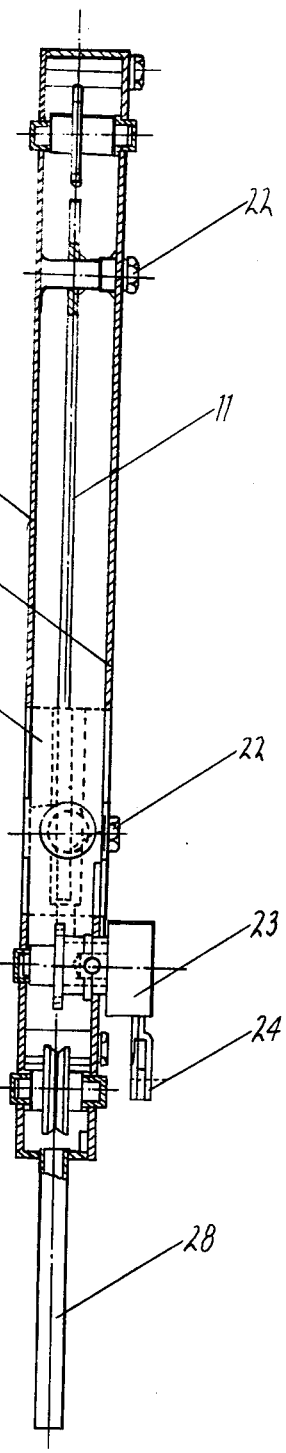
FIG. 7 is a view taken along line 7—7 of FIG. 6.

FIGS. 6—8 illustrate a device for storing and feeding rod elements like those shown in FIGS. 1—5 to a point of use.

The device comprises a housing 11 having sidewalls 12, 13, and a cover 14. A spring loaded feeder 15 retains a plurality of rod elements in the housing 11. A spring loaded plunger 16 is carried in the cover 14 and engages the feeder 15. Indicia is provided on the plunger 16 to indicate the position of the feeder 15 and thus the number of rod elements in storage beneath the feeder 15.

Handle 17 is provided to lock the cover 14 in place and to permit the cover 14 to be removed to insert rod elements beneath the feeder 15. A conveyor chain 19 is driven by sprockets 20 and notches (not shown) on the chain are spaced to engage an end of the lowermost rod element and push it toward the left in FIG. 6. The member 21 supports and guides the chain 19 as it is moved around the sprockets 20. Screws 22 mount the guide 21 to the housing 11.

A clutch drive 23 is connected with one of the sprockets 20 and provides the drive means for the conveyor chain 19 when an arm 24 is reciprocally driven by suitable means (not shown). If, of course, it is preferred a motor could be connected directly to the sprocket 20 in place of the clutch 23 and arm 24.

The rod element is delivered by the conveyor chain 19 through a guide 25 to braking rollers 26. Means 27 are provided to adjust the braking action of the rollers 26. The rollers 26 retain the rods elements sufficiently so that if they are like those shown in FIGS. 4 and 5 they are joined together to form a single ignition rod before being pushed through the exit tube 28.

Figures 9, 10:
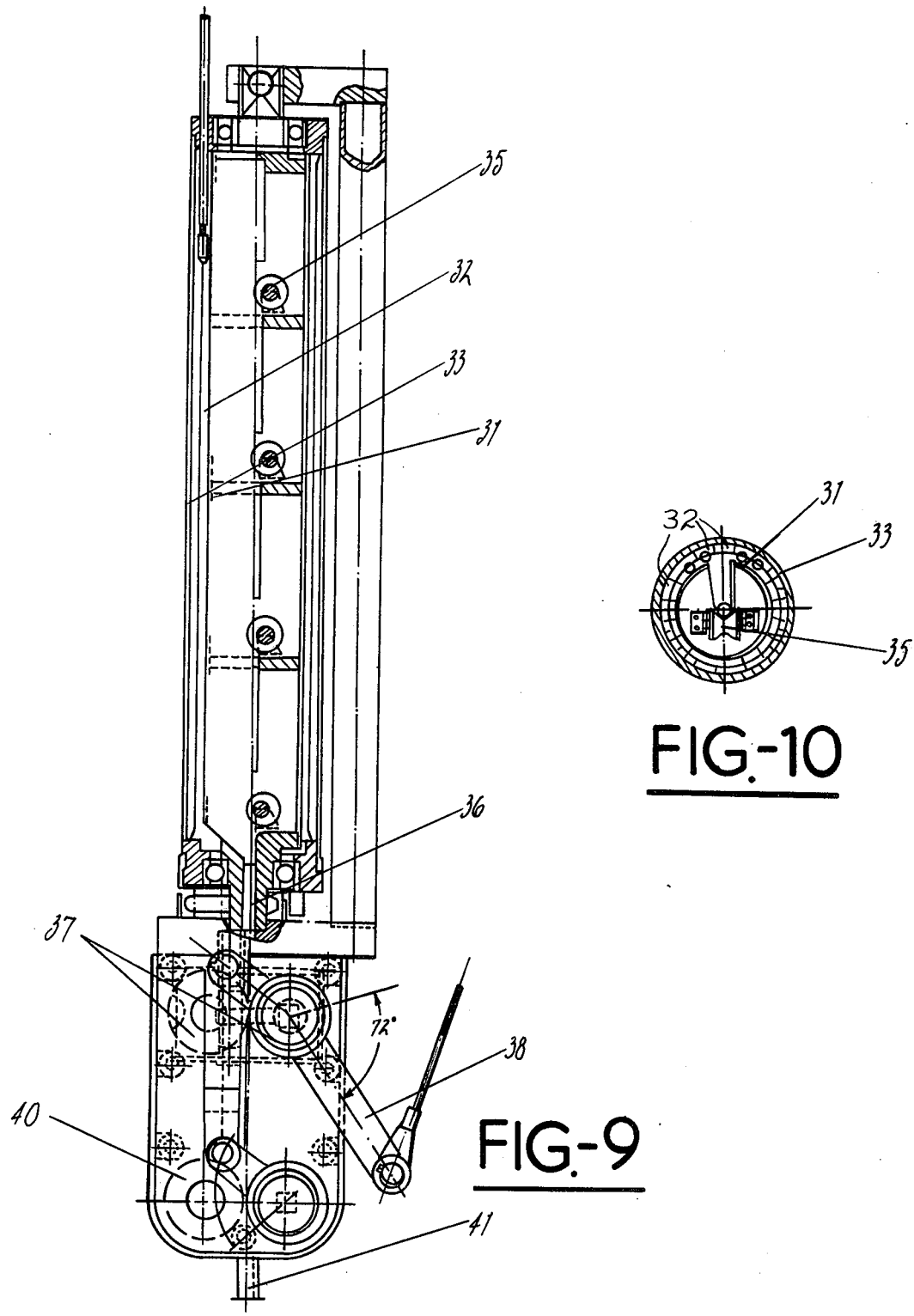
FIG. 9 illustrates in section another preferred apparatus for storing and deliverying an ignition rod.
FIG. 10 is a cross-sectional view of the cylinders illustrated in FIG. 9.

FIGS. 9 and 10 illustrate another preferred device for storing and delivering rod elements. A hollow cylindrical body 31 is provided and an outside cylinder 33 is spaced from and rotates around the body 31. Partitions 32 are provided in the cylinder 33 and a rod element is received in each of the compartments defined by the partitions 32. The compartments register with a slot 34 as the cylinder 33 rotates and the rod element carried therein drops through the slot 34 to be received on rollers 35.

A pair of drive rollers 37 are provided at the forward end of the device and are driven by a clutch and arm arrangement 38 like that described with respect to FIG. 6. Again the clutch 38 could if preferred be replaced by a motor.

Brake rollers 40 are provided to enable the rod elements to be joined together and the ignition rod formed thereby is then pushed through the guide outlet 41 to the point of use.

It is apparent that an ignition means has been described which has numerous advantages over the devices heretofore available.

It is also apparent that although I have described several embodiments of my invention many changes and modifications can be made therein without departing from the spirit of the invention or the scope of the appended claims.

I claim:

1. Means for storing and delivering ignition rod for an oxygen flame cutting or joining process to a point of use comprising:
    a plurality of individual rod elements,
    means for storing said rod elements,
    means for positioning said rod elements in end to end fashion,
    means for joining said rod elements together to form a single ignition rod, and
    means for delivering said ignition rod to the point of use.

2. The invention as defined in claim 1 and in which said storing means comprises a hollow cylindrical body, said body being provided with a plurality of partitions defining a plurality of compartments, a rod element being receivable in each of said compartments.

3. The invention as defined in claim 1 and in which said positioning means comprises said body being rotatable, a slot being provided in a second hollow cylindrical body contained within said first body and being in registration with said compartments on at a time as said first mentioned body is rotated whereby said rod element drops through from said compartment through slot, and driving rollers receiving said rod element.

4. The invention as defined in claim 1 and in which said rod elements are provided with an inner compartment and powder being disposed within said compartment.

5. The invention as defined in claim 1 and in which said means for joining said rod elements together joins said rod elements one to the other in end-to-end fashion.

6. The invention as defined in claim 5 and in which said joining means further comprises connector members disposed intermediate the ends of adjacent rod elements.

7. The invention as defined in claim 5 and in which said joining means further comprises each of said rod elements having a conically shaped head at one end and a conically shaped axial recess at the opposite end and means for urging the conically shaped head of one rod element into the conically shaped recess of another rod element.

8. The invention as defined in claim 1 and in which said storing means comprises a spring loaded feeder and said positioning means comprises a conveyor chain adapted to engage a rod element one at a time and remove said rod element from said feeder.

9. The invention as defined in claim 8 and in which said joining means comprises braking rollers engaged by said rod element whereby said rod element is retained in position until the next rod element is pushed into engaging contact with said first mentioned rod element by said conveyor chain.

* * * * *

UNITED STATES PATENT OFFICE
CERTIFICATE OF CORRECTION

Patent No. 4,057,229　　　　　　　　　　Dated November 8, 1977

Inventor(s) J. A. Zeley

It is certified that error appears in the above-identified patent and that said Letters Patent are hereby corrected as shown below:

Column 4, line 45, "on" should read --- one ---.

Signed and Sealed this

Fourteenth Day of March 1978

[SEAL]

*Attest:*

RUTH C. MASON　　　　　　　　LUTRELLE F. PARKER
*Attesting Officer*　　　　　*Acting Commissioner of Patents and Trademarks*